3,737,425
DERIVATIVES OF LINCOMYCIN
Brian Bannister, Kalamazoo, Mich., assignor to The
Upjohn Company, Kalamazoo, Mich.
No Drawing. Filed Apr. 6, 1970, Ser. No. 26,110
Int. Cl. C08b 19/00
U.S. Cl. 260—210 R          10 Claims

ABSTRACT OF THE DISCLOSURE

Alkyl α-thiolincosaminide is reacted with periodate to form alkyl 1-thio-α-D-galactohexodialdo-1,5-pyranoside, which is reacted with cyanide to form alkyl 6-cyano-1-thio-α-D-galactopyranoside. The latter is converted to antibacterially active 8-nor-lincomycins. First the 3,4-O-positions are covered by an ylidene group. This can be done initially by deacylating alkyl N-acetyl-3,4-O-ylidene-α-thiolincosaminides. The resulting alkyl 3,4-O-ylidene-α-thiolincosaminide is treated successively with periodate and cyanide. The alkyl 6-cyano-3,4-O-ylidene-α-thiolincosaminide is then tosylated and the resulting 2,7-di-O-tosyl derivatives are reduced with lithium aluminum hydride to form the 6,7-aziridino derivative which on N-acylation and solvoylsis, decaylation, and reacylation with the acid moiety of lincomycin or an analog thereof, yields the desired 8-nor-lincomycin or analog thereof. When the solvoylsis is effected with methanol or other alkanol, antibacterially active 7-O-alkyl-8-norlincomycins are obtained.

BRIEF SUMMARY OF THE INVENTION

This invention relates to novel compounds, to a process for the preparatio nthereof and to a process for converting them to antibacterially active analogs of lincomycin. More particularly the invention relates to alkyl 6-cyano-3,4-O-ylidene-1-thio-α-D-galcatopyranosides of the formula

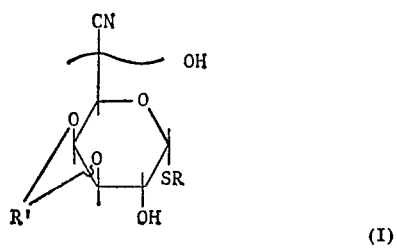

(I)

wherein R advantageously is methyl or ethyl but can be alkyl of not more than 20 carbon atoms, cycoalkyl of 3 to not more than 8 carbon atoms, or aralkyl of not more than 12 carbon atoms; R' is 2H or an ylidene radical, advantageously lower alkylidene or aralkylidene of not more than 12 carbon atoms.

The novel compounds of the invention are useful as intermediates for making antibacterially active 8-nor analogs of lincomycin and the isomers of analogs thereof and the 7-O-loweralkyl derivatives thereof.

The novel compounds of the invention are prepared by the following sequence:

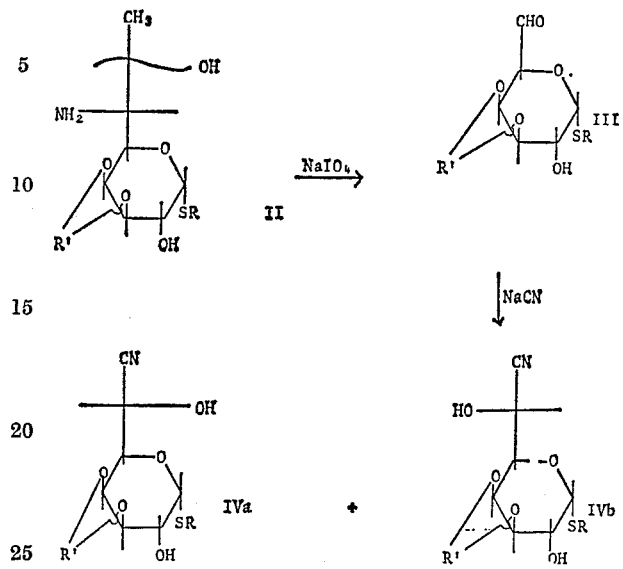

The starting compounds of Formula II wherein R' is isopropylidene and R is methyl are prepared as described in U.S. Patent 3,255,178 by N-acetylating methyl α-thiolincosaminide (identified in the patent as methyl thiolincosaminide), reacting the product with acetone and deacylating the resulting compound with hydrazine. Instead of methyl α-thiolincosaminide, there may be substituted the ethyl α-thiolincosaminide of U.S. Patent 3,361,228 (identified in the patent as ethyl thiolincosaminide). Also there can be substituted other alkyl α-thiolincosaminides as disclosed in U.S. Patent 3,380,992. Any of these alkyl α-thiolincosaminides can be used as the starting compounds wherein R' is 2H. The acetone can be substituted by other aldehydes or ketones. Thus R' can be the ylidene group of an oxo compound of the formula R'O, such as $$(CH_3)_2C=O$$

for example alkylidene of not more than 12 carbon atoms, cycloalkylidene of from 3 to not more than 8 carbon atoms, and aralkylidene of not more than 12 carbon atoms.

The reaction with the oxo compound can be effected by procedures already well known in sugar chemistry and when need be the resulting 3,4-O-ylidene group can be removed by hydrogenolysis or sovoylsis also by procedures already well known in sugar chemistry. Examples of alkylidene, cycloalkylidene and aralkylidene groups include methylene, ethylidene, propylidene, butylidene, pentylidene, hexylidene, heptylidene, octylidene, nonylidene, decylidene, undecylidene, and dodecylidene and the isomeric forms thereof, cyclopropylidene, cyclobutylidene, cyclopentylidene, cyclohexylidene, cycloheptylidene, cyclooctylidene, 2-cyclopropylethylidene, 3-cyclohexylpropylidene, benzylidene, 2-phenylethylidene, 3-phenylpropylidene, and α-naphthylmethylene, as well as the various aralkylidene groups corresponding to the various arylaldehydes disclosed in U.S. Patent 3,426,012, particularly benzaldehyde, anisaldehyde, and cinnamaldehyde. The ylidene group R' can be removed by acid-catalyzed hydrolysis in a manner already well known in the art.

The novel compounds of the invention are useful as intermediates. Thus the nitrile group can be reduced to an amino group or hydrolyzed by base catalyzed hydrolysis to an amido group or to a carboxyl group in manners already well known in the art. Also where R' is 2H they can be used to modify polyurethane resins, either as such or after condensation with ethylene or propylene oxide, the modification being effected by the interaction of the polyhydroxy compound with the polyfunctional isocyanate used in making the polyurethane.

The novel compounds IVa and IVb of the invention are also useful as intermediates for preparation of antibacterially active 8-nor analogs of lincomycin. Compounds IVa and IVb (if R' is 2H they are first reacted with an oxo compound to convert R' is to an ylidene group) are tosylated to form compounds of the formula

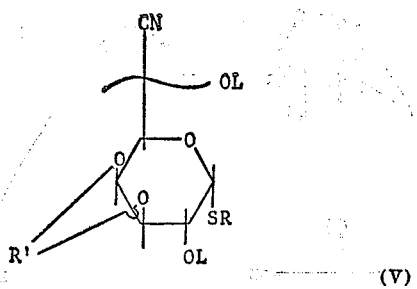

(V)

where L is the tosyl group. Other sulfonyl-type leaving groups, for example, mesyl can be used in place of the tosyl group L. The two epimers can be separated at this point if desired by processes well known in the art, for example, liquid-liquid countercurrent extraction procedures such as Craig countercurrent distribution, or partition or adsorption chromatography. On reduction with lithium aluminum hydride in a manner already known in the art compounds of Formula V are converted to 6,7-aziridino compounds of the formulae

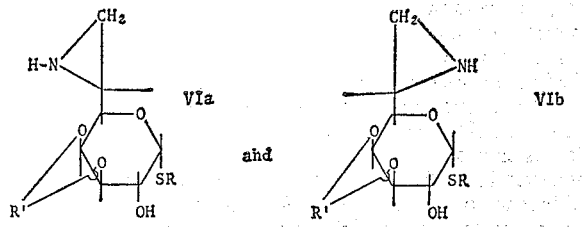

On reacting compounds of Formulae VIa and VIb with acetic anhydride in isopropyl alcohol the corresponding N-acyl aziridino compounds are obtained, which on acid-catalyzed solvolysis give 8-nor compounds of the formulae

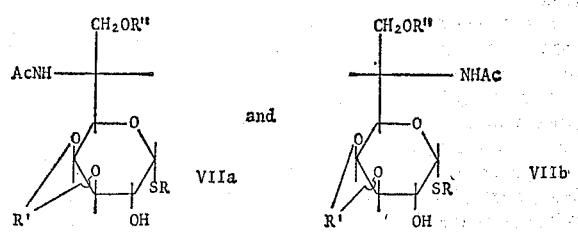

wherein R'' is hydrogen (from hydrolysis), methyl (from methanolysis), or other lower alkyl (from alkanolysis). Sometimes the N-acylation and alkanolysis proceed concomitantly. Thus treatment of compounds VIa and VIb with acetic anhydride and methanol results in compounds VIIa and VIIb where Ac is acetyl and R'' is methyl.

The acid used to catalyze the solvolysis should not be a strong acid.

The Ac and R' groups are then removed by hydrazinolysis to the amino acetonide followed by cleavage with acid, or vice versa, to form an alkyl 8-nor-α-thiolincosaminide and its 6-epimer of the formulae

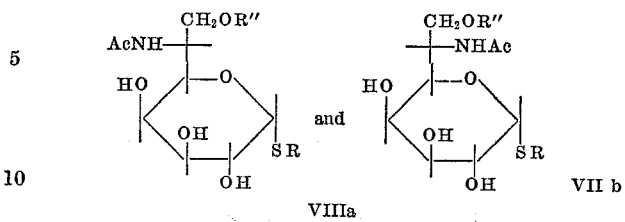

wherein Ac is hydrogen. Compounds VIIIa and VIIIb are then acylated with trans-1-methyl-4-propyl-L-2-pyrrolidinecarboxylic acid in a manner already well known in the art (see U.S. 3,380,992) to form an 8-nor-lincomycin and its 6-epimer of the Formulae VIIIa and VIIIb wherein Ac is trans-1-methyl-4-propyl-L-2-pyrrolidinecarboxylic. R'' can be hydrogen (8-nor-lincomycin and its 6-epimer) or methyl (7-O-methyl-8-nor-lincomycin and its 6-epimer). The 7-O-methyl and/or the 1-S methyl can also be other lower alkyl.

By substituting other L-2-pyrrolidine carboxylic acids of the formula

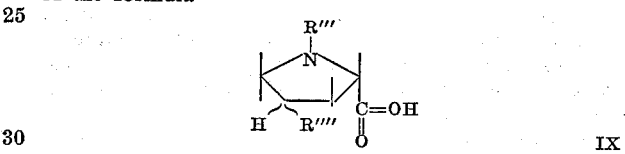

IX wherein R''' and R'''' are lower alkyl or hydrogen antibacterially active analogs of 8-nor-lincomycin and its 6-epimer are obtained.

DETAILED DESCRIPTION OF THE INVENTION

The periodate oxidation of the thioglycoside, Formula II, is carried out in accordance with standard procedures used in periodate oxidation of α-amino-alcohols and sugars. See pages 903–919 of The Monosaccharides, Stanek et al., Academic Press, N.Y., 1963. The oxidation is atypical in the respect, however, that the sulfoxide or sulfone is not formed.

Advantageously, especially where R' is ylidene, the reaction is carried out in a water-miscible polar solvent such as methanol, ethanol, or like alkanol, dioxane, or dimethylformamide, in admixture with a minor amount of water. The pH advantageously is kept above pH 5, especially where R' is ylidene, and below about pH 8 and the molar concentration kept high, for example, between about 0.1 and 0.2 molar. The proportions of thioglycoside and periodate are stoichiometric, namely 1 to 1. The periodate is sodium meta-periodate (NaIO$_4$) but can be potassium or like alkali metal periodate. The temperature advantageously is kept below room temperature preferably between about minus 10° C. and plus 10° C.

The conversion of the aldehyde, Formula III, to the cyanohydrins, Formulae IVa and IVb is also carried out by standard procedures used for the preparation of cyanohydrins in the so called "cyanohydrin synthesis," Stanek, vide supra, pp. 141–143. The present process is atypical, however, in that it is applied to a galacto-1,5-dialdopyranose in the form of a 1-thioglycoside. Also, it is atypical in that the reaction is effected in methanol or like polar solvent with only a minor amount of water present.

This will ordinarily be the same solvent as that used in the periodate oxidation.

It is advantageous in these accounts, and especially where R' is ylidene, to keep the pH between about pH 4 and pH 9.

The proportions are not critical although it is of advantage to use a substantial excess of sodium cyanide.

In place of sodium cyanide, there can be used potassium or other alkali metal cyanides, or hydrogen cyanide.

The invention may be more fully understood by reference to the following example in which the parts are by weight unless otherwise specified.

Example 1

A solution of 5 gms. (1 equiv.) of methyl 3,4-O-isopropylidene-α-thiolincosaminide in 70 ml. of methanol was cooled to −5° C. in an ice/methanol bath. To this solution was added a solution of 3.9 gms. (1.07 equiv.) of sodium periodate (NaIO₄) in 30 ml. water. Addition was made dropwise at a rate to keep the reaction mixture at a temperature between 0 and 5° C. and was made over a 10 minute period. A heavy precipitate of sodium iodate (NaIO₃) formed, and was filtered off, and washed well with methanol. The filtrate plus washings containing the desired product, methyl 3,4-O-isopropylidene-1-thio-α-D-galacto-hexadialdo-1,5-pyranoside, was cooled in an ice/methanol bath. To the cooled filtrate there was added 30 ml. of water followed by 6 gms. of sodium bicarbonate and 3.34 gms. (4 equiv.) of sodium cyanide. The temperature rise from −10° C. to −5° C. After stirring at the latter temperature for 1 hour the solvent was removed as completely as possible on a rotary evaporator at 40° C./7 mm. to a solid residue which was dried by azeotropic distillation with an absolute ethanol-benzene mixture, and then extracted into methylene chloride. The methylene chloride extract was filtered, the cake washed well with methylene chloride, and the combined extract and wash dried over sodium sulfate, and evaporated to dryness. The resulting solid was chromatographed on 1200 gms. of silica gel in a 5.8 x 94 cm. column with a hold-up volume of 2250 ml. using methanol:chloroform (1:20 v./v.) as the solvent system. After a forerun of 1240 ml., 50-ml. fractions were collected. Fractions 38–45 contained unreacted starting material whereas fractions 50–70 consisted of a mixture of the two epimers, methyl 6-cyano-3,4-O-isopropylidene-1-thio - D - glycero-α-D-galactopyranoside and methyl 6-cyano-3,4-O-isopropylidene-1-thio-L-glycero-α-D-galactopyranoside.

Mass spectographic analysis showed the fractions 38–45 to have molecular ion of 248 which corresponds to the unchanged aldehyde, methyl 3,4-O-isopropylidene-1-thio-α-D-galactohexadialdo-1,5-pyranoside, and mass spectographic analysis of fractions 50–60 gave a molecular ion of 275 which corresponds to the theoretical molecular weight of the 6-cyano compounds, methyl 6-cyano-3,4-O-isopropylidene - 1 - thio-D- and L-glycero-α-D-galactopyranoside.

By substituting the methyl 3,4-O-isopropylidene-α-thiolincosaminide by methyl α-thiolincosaminide, methyl 1-thio-α-D-galactohexadialdo-1,5-pyranoside and methyl 6-cyano-1-thio-D- and L-glycero-α-D-galactopyranosides are obtained. By substituting the methyl 3,4-O-isopropylidene-α-thiolincosaminide or the methyl-α-thiolincosaminide by the corresponding ethyl, propyl, and butyl analogs, there are obtained ethyl, propyl, and butyl 1-thio-α-D-galactohexadialdo-1,5-pyranosides and ethyl, propyl, and butyl 6-cyano-1-thio-D- and L-glycero-α-D-galactopyranosides.

I claim:
1. A compound of the formula

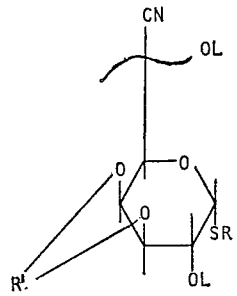

wherein R is lower alkyl, L is mesyl or tosyl or hydrogen, and R' is 2H or alkylidene of not more than 12 carbon atoms, cycloalkylidene of 3 to not more than 8 carbon atoms, or aralkylidene of not more than 12 carbon atoms.

2. A compound of claim 1 wherein L is tosyl or mesyl.
3. A compound of claim 1 wherein L is hydrogen.
4. The compound of claim 2 wherein R is lower alkyl, L is tosyl, and R' is isopropylidene.
5. The compound of claim 2 wherein R is methyl, L is tosyl, and R' is isopropylidene.
6. A compound of claim 2 wherein R' is 2H.
7. A compound of claim 3 wherein R' is 2H.
8. A compound of the formula

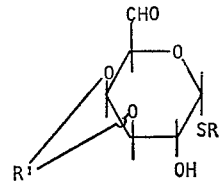

wherein R is lower alkyl and R' is alkylidene of not more than 12 carbon atoms, cycloalkylidene of 3 to not more than 8 carbon atoms, or aralkylidene of not more than 12 carbon atoms.

9. The compound of claim 8 in which R is lower alkyl, and R' is isopropylidene.
10. The compound of claim 8 in which R is methyl and R' is isopropylidene.

References Cited

UNITED STATES PATENTS 3,282,918  11/1966  Hoeksema et al. __ 260—210 R
3,549,615  12/1970  Birkenmeyer _____ 260—210 R

OTHER REFERENCES

Pigman: "The Carbohydrates," 1957, Academic Press Inc., New York, N.Y., pp. 106–108.

Stanek et al.: "The Monosaccharides," 1963, Academic Press, New York, N.Y., pp. 903–914.

LEWIS GOTTS, Primary Examiner

J. R. BROWN, Assistant Examiner

U.S. Cl. X.R.

260—2.5